Nov. 17, 1970    J. FILLIOL    3,540,822
AGRICULTURAL HEATER SYSTEM AND HEATERS THEREFOR
Filed Jan. 21, 1969
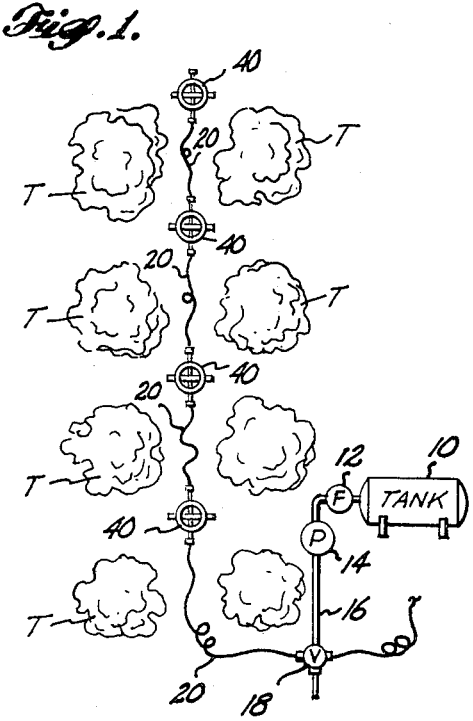
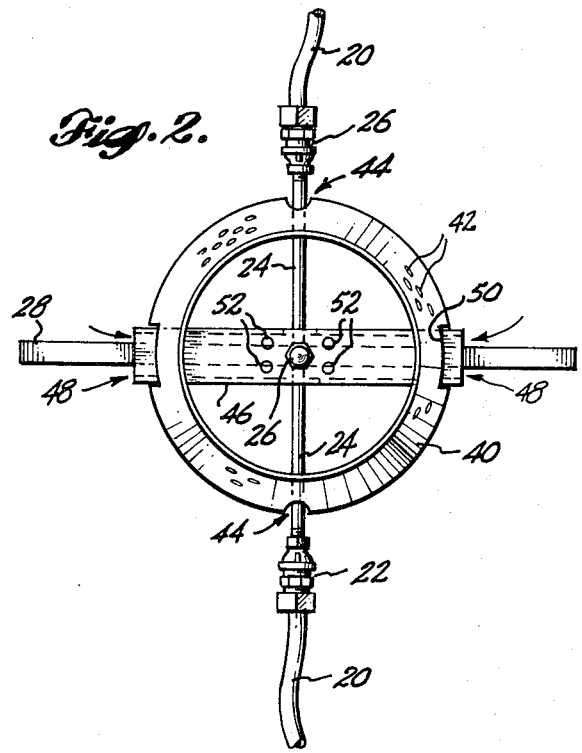
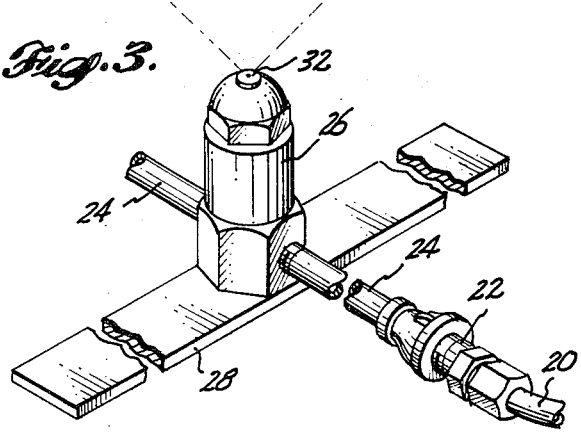
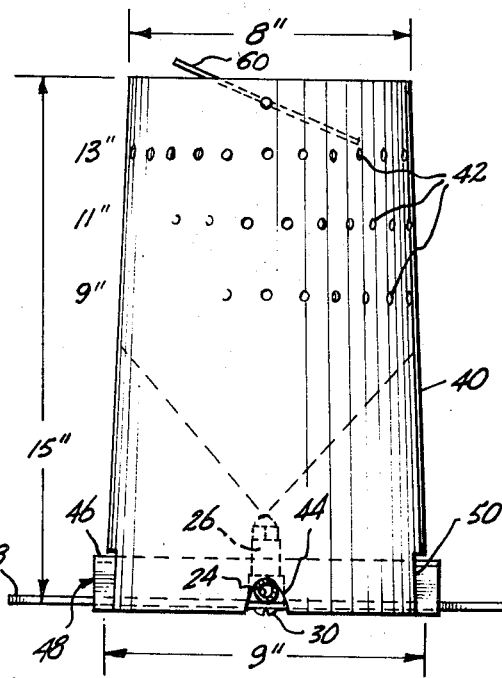
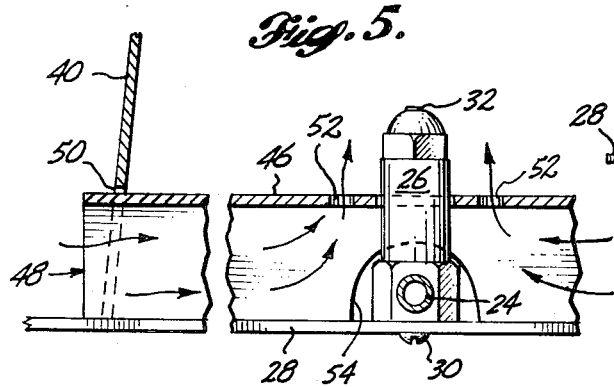
INVENTOR
JACQUES FILLIOL
BY Ford E. Smith
ATTORNEY

United States Patent Office 3,540,822
Patented Nov. 17, 1970

1

3,540,822
AGRICULTURAL HEATER SYSTEM AND
HEATERS THEREFOR
Jacques Filliol, Zillah, Wash.; Joanne Marie Filliol, 220
Westover Drive, Yakima, Wash. 98902, executrix of
said Jacques Filliol, deceased
Filed Jan. 21, 1969, Ser. No. 792,381
Int. Cl. A01g *13/06*
U.S. Cl. 431—207                                        3 Claims

ABSTRACT OF THE DISCLOSURE

Liquid fuel under pressure is conducted from a source over or under the ground among agricultural plantings. Spaced apart burner nozzles are arranged in the conductor means for upward discharge. In an upwardly open, upright burner housing surrounding each nozzle and rising thereabove, combustion of discharged liquid fuel occurs to produce heat and hot gases. Heat transfer means are included in the conductor system in proximity to the burner nozzles to absorb heat of combustion and to impart the same to liquid fuel flowing in the system.

SUMMARY OF THE INVENTION

It has become increasingly popular and desirable in agricultural heater systems employed to combat frost, low temperatures and the like to provide a central source of fuel under pressure, a plurality of heater or burner units, and conductor means between such source and said units. In this practice a large central storage tank of fluid fuel supplies a pump from which extends conduits including a main or mains which service or supply two or more laterals. These conduits are laid out in a pattern of choice usually dictated by topography, the planting pattern or the vegetation to be protected and similar related factors. As an example of a suitable environment for this invention, reference herein will be made to an orchard in which the trees are usually planted equally spaced in rows whereby a grid pattern results. Between and among such trees the orchardist usually locates the heaters or burner units in a pattern calculated to supply heat throughout the orchard in a fairly uniform manner. The heater and burner units are connected in series in lateral conduits which join mains and which in turn connect with and receive fuel from the pressurized source. The advent of plastic, non-metallic, non-rigid conduit materials make such a system simple and inexpensive to lay out and install. Generally such conduit material need only be laid out on the ground surface and connected with the heaters wherever they are located. However, at least two problems are presented. One is that such plastic conduit is heat-sensitive and may not be used practically under conditions of excessively elevated temperaturs. Another problem is presented with respect to the runs of unheated conduit between heaters. There it is exposed to low temperatures which, in the case of plastic piping, tends to contract and shrink thus reducing its internal diameter. Such piping is normally measured and rated at about room temperature. One manufacturer, at least, specifies diameters measured at 73.4° F. From this it can be seen that a ¼" plastic or synthetic pipe at normal temperature when exposed to, say, temperatures in the neighborhood of 30–40° F. would have an appreciably reduced internal diameter. This can have a detrimental effect on the operation of the burner units. Each burner includes a nozzle having a discharge orifice rated as to output in gallons per hour at various pressures. When the I.D. of the piping shrinks, pressure variation in the fuel supply occur and a rated nozzle fails to discharge the proper or selected gallonage to maintain the desired heat output.

2

Also a nozzle not operated at its rated capacity tends to be inefficient and to produce excess smoke, promote carbonization, and generally to be undesirable.

The problem is noticeable with but a single burner in a conduit. It is magnified and aggravated where there is a series of burners all supplied, for example, through a single lateral run of conduit. This is due to the cumulative effect of shrinking occurring in the intervening portions of conduit between successive burners. While the fuel will flow, it will do so at reduced pressure. Another problem is encountered with respect to the fuel itself. It suffers fluidity or viscosity changes under low temperatures which can deleteriously affect the operation of a burner system. This problem may be amplified as the system extends farther and farther away from the source of fuel. The progressively decreased temperature lowering in the fuel produces non-uniform burning, smoking, carbonization and the like.

The invention essentially comprises the provision of heat transfer means in an elongated or extended liquid fuel conduit system capable of absorbing heat of combustion occurring at each of a plurality of burner nozzles in said system. Said absorbed heat is imparted to liquid fuel flowing in the system to improve its combustion properties and to insure a practically smokeless, highly efficient combustion with the upright burner housing means surrounding each of the burner nozzles. Also such absorbed heat is imparted to the flowing fuel, improving its fluidity and viscosity and also by its passage imparting heat to the plastic piping tending to combat or overcome its shrinking and consequent reduction in internal diameter.

DESCRIPTION OF THE DRAWINGS

FIG. 1 is a schematic view showing the agricultural heater system;

FIG. 2 is a plan view from above a burner nozzle and its appurtenances;

FIG. 3 is a perspective view of a burner nozzle as installed in an elongated or extended conduit system;

FIG. 4 is a vertical, elevational view of a burner housing; and

FIG. 5 is a fragmentary view in enlarged scale in cross section showing supplemental or auxiliary air inlet means to a burner nozzle.

SPECIFICATION

In the schematic view of FIG. 1 is shown two rows of trees T or other vegetation which it may be desirable to protect from frost and chilling air conditions. From tank 10 liquid fuel is drawn through filter 12 by means of pump 14. The fuel flows through conduit 16 under pressure to a divider valve 18. A distribution conduit system, as shown, extends from the valve 18 and may be described as a "lateral." Desirably it comprises flexible, tubular conduit elements 20 which may be laid on the ground or buried therebeneath. By coupling means 22 conduit 20 is joined to metallic, tubular conduit elements 24. By a subsequent connector means 26 fuel flows to another run of flexible conduit 20. That shown in FIG. 1 is a typical lateral and it may comprise several flexible conduit sections 20 between each pair of metallic conduits 24.

As shown in FIGS. 2 and 3, an upstanding nozzle body 26 is coupled intermediate of the paired metallic conduit elements 24. Preferably nozzle 26 is mounted on a foot strap 28 by means of screw 30 (see FIG. 5). The nozzle body 26 has a minute orifice 32 that is upwardly directed and from which a conical spray of liquid fuel is discharged as indicated by dashed lines in FIGS. 3 and 4. The strap 28 extends laterally from the nozzle a desirable distance to insure that the nozzle is maintained in an upright position.

The upright burner housing 40 which may be either cylindrical, tapered cylindrical, or rectangular in cross section surrounds, encloses and rises above the nozzle 26. A desirable relationship is to proportion such housing (in the case of the conical shape shown) approximately 9" in diameter at the bottom and 8" in diameter at the top. The overall height desirably is about 15". With such a housing and employing a nozzle discharging a 90° hollow cone of fuel having an orifice capable of discharging 0.85 gallon per hour of this fuel supplied thereto at a pressure of 100 lbs. per square inch pressure, the upper limits of the conical fuel discharge spray from the nozzle will impinge on the inner surfaces of the housing 40 approximately 7" above the ground level. Air openings 42 are provided in the housing above the upper limits of the fuel spray spray impingement point of the housing. An ideal arrangement is to provide three annular rows of openings 42, as shown in FIG. 4, spaced approximately 9", 11" and 13" above ground level.

A pivoted damper 60 in housing 40 may be included to control draft. Notches at 44 may be supplied to permit the bottom edge of housing 40 to straddle the tubes 24 and to be imbedded in the earth. A desirable cylindrical housing is 10½" in diameter with a 12" height and its mouth partially closed by an 8" butterfly damper.

On occasion, and for the purposes of improving combustion, a lateral tunnel member 36, open at its end 48, extend through housing 40 near the bottom, the same being likewise notched at 50 to accommodate member 46. As shown in FIG. 5, air enters the open ends of tunnel or duct member 46 and flows inward and upward into the housing through openings 52 adjacent nozzle 26. Where the tunnel 46 crosses the metallic conduits 24 close to the nozzle, the same is notched at 54.

When the described system is located in an orchard adjacent the trees therein, it is preferable that the housing be pressed down to the earth so that its bottom edge is somewhat embedded. This produces a relatively air-tight situation in the bottom part of the housing around the nozzle. In this way the introduction of air to the nozzle for the purposes of combustion can be accurately and positively controlled through the size of the transverse tunnel or duct 46.

Heat is absorbed by conduits 24 as exposed in the lower part of the combustion chamber and is then transferred to the through-flowing fuel. Thus in a series, as in FIG. 1, each of the heaters adds an increment of heat to the fuel in the system for the purposes of maintaining fluidity and of combatting shrinkage. It has been found that after something over twenty-eight hours of sonsecutive burning there was no evidence of sooting at the nozzle. It was also observed that there was a practical and total absence of smoke or other visible hydrocarbon matter being discharged into the air. Observations of actual burning operations disclose a clean, high velocity, highly effective flame emitting from the upper end of the housing into the surrounding air capable of rapidly heating the same and of effectively combatting the effects of its low temperature or of frosts in the environment.

It will be apparent to those skilled in the art that changes and modifications may be made in the structure shown without departing from the spirit of the invention as set forth and claimed hereafter.

What is claimed is:

1. An agricultural heater system, comprising:
   an extended liquid fuel conduit system associated with a source of liquid fuel and means for imparting substantial flow pressure to liquid fuel withdrawn from said source and introduced into said conduit system, said system being disclosed in an agricultural plot;
   a plurality of spaced-apart burner nozzles in said conduit system adapted to pass fuel moving in said system to subsequent nozzles therein, said nozzles being arranged to discharge fuel in an upward direction for combustion purposes;
   an upwardly open upright burner housing surrounding each nozzle in a substantially air-tight manner from the ground level upward to above the discharge of such nozzle;
   air inlet conduit means transverse the axis of said housing at ground level to receive and conduct air from without the housing, said air inlet conduit means having an air outlet opening close to the nozzle; and
   heat transfer means in said conduit system extending from each nozzle to external of the housing to absorb heat of combustion occurring at each such nozzle and within such housing, and to impart the same to liquid fuel flowing in said conduit system and passing through such nozzle.

2. An orchard heater system in accordance with claim 1 in which the heat transfer means in said conduit system comprising metallic piping, and those portions of said fuel conduit system between said heat transfer means comprising non-metallic piping.

3. Apparatus according to claim 1 in which the air inlet conduit means has a plurality of air outlet openings in close surrounding relationship to the nozzle.

References Cited
UNITED STATES PATENTS

| | | | |
|---|---|---|---|
| 2,151,060 | 3/1939 | Tschudy et al. | 126—59.5 |
| 2,217,536 | 10/1940 | Birrell | 126—59.5 |
| 3,391,684 | 7/1968 | Brader | 126—59.5 |

EDWARD G. FAVORS, Primary Examiner

U.S. Cl. X.R.

47—2; 126—59.5